(12) United States Patent
Takahashi et al.

(10) Patent No.: US 7,923,503 B2
(45) Date of Patent: Apr. 12, 2011

(54) AQUEOUS PRESSURE-SENSITIVE ADHESIVE COMPOSITION AND USE THEREOF

(75) Inventors: Akiko Takahashi, Ibaraki (JP); Mami Ikeya, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 779 days.

(21) Appl. No.: 11/833,443

(22) Filed: Aug. 3, 2007

(65) Prior Publication Data

US 2008/0033096 A1    Feb. 7, 2008

(30) Foreign Application Priority Data

Aug. 3, 2006    (JP) .................. 2006-212405

(51) Int. Cl.
*C08F 2/16* (2006.01)
*C08L 11/02* (2006.01)
*C08L 33/00* (2006.01)
(52) U.S. Cl. ...................... 524/460; 524/556
(58) Field of Classification Search .................. 524/460, 524/556
See application file for complete search history.

(56) References Cited

U.S. PATENT DOCUMENTS

| | | |
|---|---|---|
| 2003/0068492 A1 | 4/2003 | Husemann et al. |
| 2005/0038152 A1* | 2/2005 | Naito et al. .................... 524/270 |

FOREIGN PATENT DOCUMENTS

| | | |
|---|---|---|
| DE | 10244087 A1 | 4/2003 |
| EP | 1 300 455 A2 | 4/2003 |
| JP | 2003-096420 | 4/2003 |
| JP | 2003096420 A * | 4/2003 |
| JP | 2003-327933 | 11/2003 |
| JP | 2005-113016 | 4/2005 |

* cited by examiner

*Primary Examiner* — Michael M Bernshteyn
(74) *Attorney, Agent, or Firm* — Leydig, Voit & Mayer, Ltd.

(57) ABSTRACT

There provided a pressure-sensitive adhesive (PSA) composition constituting a PSA layer, which may exhibit a plurality of properties in a well-balanced manner, and a PSA sheet including the PSA layer. The composition is an aqueous PSA composition in which an acrylic polymer serves as a main component and the acrylic polymer is dispersed in water, and contains: A) acrylic polymer obtained by polymerizing a monomer raw material including alkyl(meth)acrylate as a main monomer, a first functional monomer having a first functional group to react with a hydrazino group, and a second functional monomer having a second functional group to react with a carbodiimide group; B) a hydrazine-based crosslinking agent; and C) a carbodiimide-based crosslinking agent.

11 Claims, 2 Drawing Sheets

AQUEOUS PRESSURE-SENSITIVE ADHESIVE COMPOSITION AND USE THEREOF

BACKGROUND OF THE INVENTION

1. Field of the Invention

The present invention relates to an aqueous pressure-sensitive adhesive composition containing an acrylic polymer as a main component, and a pressure-sensitive adhesive sheet using such composition.

The present application claims a priority based on Japanese Patent Application No. 2006-212405 filed on Aug. 3, 2006, the entire contents of which are incorporated herein by reference.

2. Description of the Related Art

An aqueous dispersion type (aqueous) pressure-sensitive adhesive composition in which an acrylic polymer is dispersed in water uses water as the dispersion medium, and therefore is desirable from the standpoint of environmental health as compared with a solvent-based pressure-sensitive adhesive composition. In addition, such acrylic aqueous pressure-sensitive adhesive composition has an advantage of easily forming a pressure-sensitive adhesive layer having more excellent solvent resistance and a pressure-sensitive adhesive sheet having such pressure-sensitive adhesive layer.

Under these circumstances, acrylic aqueous pressure-sensitive adhesive compositions that allow the formation of higher-performance pressure-sensitive adhesive sheets are in demand. It would be useful to provide an acrylic aqueous pressure-sensitive adhesive composition suitable for a pressure-sensitive adhesive sheet, which may exhibit a plurality of properties such as adhesive strength (pressure-sensitive adhesive force), cohesive strength (in particular, cohesive strength under high temperature conditions) at a higher level in a well-balanced manner, and for fabricating such pressure-sensitive adhesive sheet.

As it has been known, one methodology to enhance the cohesive strength of a pressure-sensitive adhesive layer is to blend a crosslinking agent with the pressure-sensitive adhesive composition. For example, Japanese Patent Application Publication No. 2003-096420 discloses an emulsion-type pressure-sensitive adhesive composition wherein a crosslinking agent selected from carbodiimide compounds, oxazoline compounds, aziridine compounds, hydrazine compounds and the like is blended with an acrylic resin emulsion obtained by two-step polymerization. Japanese Patent Application Publication No. 2003-327933 discloses an acrylic emulsion-type pressure-sensitive adhesive wherein a hydrazine compound serving as a crosslinking agent is blended with an acrylic resin emulsion having a high gel fraction. In all the examples disclosed in these documents, a single (one kind of) crosslinking agent is blended with the acrylic resin emulsion. Japanese Patent Application Publication No. 2005-113016 is related to a tackifier resin emulsion which is a water-dispersed mixture of a tackifier resin and a crosslinking agent capable of reacting with the tackifier resin.

However, the conventional techniques to enhance the cohesive strength by blending a crosslinking agent are likely to significantly degrade other properties (e.g., pressure-sensitive adhesive force) in exchange for the enhanced cohesive strength. Here, even when the cohesive strength is attempted to be balanced with the pressure-sensitive adhesive force or the like by simply increasing/decreasing the amount of the crosslinking agent used, it is difficult to satisfy these properties at the same time and at a high level.

SUMMARY OF THE INVENTION

An object of the present invention is to provide a pressure-sensitive adhesive sheet which may exhibit a plurality of properties such as pressure-sensitive adhesive force and cohesive strength at a higher level and in a well-balanced manner. Another object of the present invention is to provide an aqueous pressure-sensitive adhesive composition suitable for forming a pressure-sensitive adhesive layer used for such pressure-sensitive adhesive sheet.

The present invention provides an aqueous (aqueous dispersion type) pressure-sensitive adhesive composition in which an acrylic polymer serves as a main component and the acrylic polymer is dispersed in water. The composition contains an acrylic polymer (the component A) obtained by polymerizing a monomer raw material containing an alkyl(meth) acrylate as a main monomer, a first functional monomer having a first functional group to react with a hydrazino group, and a second functional monomer having a second functional group to react with a carbodiimide group. The composition further contains a hydrazine-based crosslinking agent (the component B). The composition further contains a carbodiimide-based crosslinking agent (the component C).

Acrylic aqueous pressure-sensitive adhesive compositions (typically, acrylic emulsion-type pressure-sensitive adhesive compositions) having such compositions may offer a pressure-sensitive adhesive (typically, a pressure-sensitive adhesive layer) with higher performance as compared to aqueous pressure-sensitive adhesive compositions containing only one of either a hydrazine-based crosslinking agent or a carbodiimide-based crosslinking agent. It is possible to form a pressure-sensitive adhesive layer achieving, for example, both the pressure-sensitive adhesive force and the cohesive strength (particularly, the cohesive strength under high temperature conditions) at a higher level in a well-balanced manner.

In a preferred embodiment of an aforementioned pressure-sensitive adhesive composition, the composition contains a hydrazine-based crosslinking agent (the component B) and a carbodiimide-based crosslinking agent (the component C) in a proportion such that the number of moles of the crosslinkable functional group (which refers to the functional group involved in crosslinking reactions) contained in the carbodiimide-based crosslinking agent (the component C) is about 0.2 to 5 times the number of moles of the crosslinkable functional group contained in the hydrazine-based crosslinking agent (the component B). A composition composed of the crosslinking agents containing the crosslinkable functional groups in a molar ratio within the above range may increase the advantage of using hydrazine-based crosslinking agent and carbodiimide-based crosslinking agent in combination. For practical use, for example, it may be possible to form a pressure-sensitive adhesive layer that is to achieve a better performance balance in terms of a plurality of properties.

The amount of the hydrazine-based crosslinking agent (the component B) contained in an aforementioned pressure-sensitive adhesive composition is preferably within the range from about 0.001 to 1 part by mass with respect to 100 parts by mass of (A) the acrylic polymer. Moreover, the amount of the carbodiimide-based crosslinking agent (the component C) contained in the pressure-sensitive adhesive composition is preferably within the range from about 0.01 to 1 part by mass with respect to 100 parts by mass of the acrylic polymer (the component A). A composition containing the crosslinking agents in the above ranges with respect to the acrylic polymer may be suitable for forming a pressure-sensitive adhesive layer that are to achieve better performance balance in terms of a plurality of properties.

In a preferred embodiment, the number of moles of the first functional group contained in the acrylic polymer (the component A) is about 1.5 times or more (typically about 1.5 to 50 times) the number of moles of the hydrazino group contained in the hydrazine-based crosslinking agent (the component B). A composition containing the first functional group in the above range with respect to the hydrazino group can increase the efficiency of the crosslinking reaction between the first functional group and the hydrazine-based crosslinking agent. Therefore, the advantage of using the hydrazine-based crosslinking agent and the carbodiimide-based crosslinking agent in combination may be more appropriately obtained.

In a preferred embodiment, the number of moles of the second functional group contained in the acrylic polymer (the component A) is about 10 times or more (typically about 10 to 300 times) the number of moles of the carbodiimide group contained in the carbodiimide-based crosslinking agent (the component C). A composition containing the second functional group in the above range with respect to the carbodiimide group can increase the efficiency of the crosslinking reaction between the second functional group and the carbodiimide-based crosslinking agent. Therefore, the advantage of using the hydrazine-based crosslinking agent and the carbodiimide-based crosslinking agent in combination may be more appropriately obtained.

The pressure-sensitive adhesive composition disclosed herein may further contain a tackifier. For example, the pressure-sensitive adhesive composition preferably contains a tackifier having a softening point of about 140° C. or higher (typically about 140 to 180° C.). A pressure-sensitive adhesive composition containing a tackifier having such property may offer pressure-sensitive adhesive layers with higher performance. It is possible to form pressure-sensitive adhesive layers achieving, for example, both the pressure-sensitive adhesive force and the cohesive strength (particularly, the cohesive strength under high temperature conditions) at a higher level in a well-balanced manner.

In addition, the present invention provides a pressure-sensitive adhesive sheet furnished with pressure-sensitive adhesive layer formed by using any of aqueous pressure-sensitive adhesive compositions disclosed herein. Such a pressure-sensitive adhesive sheet may achieve, for practical use, a better performance balance in terms of the plurality of properties. It is possible, for example, to achieve both the pressure-sensitive adhesive force and the cohesive strength (particularly, cohesive strength under high temperature conditions) at a higher level in a well-balanced manner.

DETAILED DESCRIPTION OF THE INVENTION

Hereinafter, preferred embodiments of the present invention will be described. Note that the matters that are other than the matters referred otherwise herein and are required for conducting the present invention may be regarded as design matters by a skilled person in the art based on the conventional art in the field. The present invention can be conducted based on the content disclosed herein and the technical common knowledge in the field.

Acrylic polymer (the component A) constituting an aqueous pressure-sensitive adhesive composition disclosed herein is a copolymer obtained by polymerizing a predetermined monomer raw material. The monomer raw material contains alkyl (meth)acrylate, namely (meth)acrylic ester of alkyl alcohol, as the main monomer (main constituent monomer). Here, the term "(meth)acrylic acid" includes both acrylic acid and methacrylic acid. The phrase "contains alkyl(meth)acrylate . . . as the main monomer" means that the proportion of the alkyl(meth)acrylate contained (the total amount of all alkyl(meth)acrylates contained when two or more kinds are contained) in the total amount of the monomer raw material exceeds 50 mass %. The content proportion of alkyl(meth)acrylate may be, for example, more than 50 mass % up to 99 mass % of the total monomer raw material. A monomer raw material having alkyl (meth)acrylate in the proportion of about 70 to 99 mass % is preferred and a monomer raw material having it in the proportion of about 80 to 98 mass % is more preferred. The proportion of alkyl(meth)acrylate in the monomer raw material may be about 90 to 98 mass %. Normally, this proportion corresponds nearly to the proportion of copolymerization of alkyl(meth)acrylate in acrylic polymer obtained by polymerizing the monomer raw material.

Alkyl(meth)acrylate constituting an above monomer raw material may be one or two or more kinds selected from compounds represented by the following chemical formula (1):

$$CH_2=C(R^1)COOR^2 \qquad (1)$$

where $R^1$ is a hydrogen atom or a methyl group, and $R^2$ is an alkyl group having 1 to 20 carbon atoms. Specifically, examples of $R^2$ include a methyl group, an ethyl group, a propyl group, an isopropyl group, a butyl group, an isobutyl group, a pentyl group, an isopentyl group, hexyl group, a heptyl group, a 2-ethylhexyl group, an isooctyl group, an isononyl group, and an isodecyl group. Among these, the alkyl groups having 2 to 14 carbon atoms (hereinafter such range of carbon atoms may be represented by "$C_{2-14}$") are preferable, and the alkyl groups having $C_{2-10}$ (e.g., a butyl group, a 2-ethylhexyl group, or the like) are more preferable.

In a preferred embodiment, the (meth)acrylic ester of alkyl alcohol having $C_{2-10}$ (more preferably $C_{4-8}$) in $R^2$ of the above chemical formula (1) makes up about 70 mass % or more (more preferably about 90 mass % or more) of the total amount of alkyl (meth)acrylate contained in the monomer raw material. Essentially all the alkyl (meth)acrylates contained in the monomer raw material may be $C_{2-10}$ alkyl (more preferably $C_{4-8}$ alkyl) (meth)acrylates. For example, the monomer raw material may contain, as alkyl(meth)acrylate, only butyl acrylate, only 2-ethylhexyl acrylate, or both butyl acrylate and 2-ethylhexyl acrylate. In a monomer raw material containing butyl acrylate and/or 2-ethylhexyl acrylate as alkyl(meth)acrylate, the content proportions (mass ratio) between butyl acrylate (BA) and 2-ethylhexyl acrylate (2EHA) may be, for example, BA/2EHA=0/100 to 100/0 (preferably 0/100 to 70/30, more preferably 5/95 to 60/40).

The monomer raw material contains one or two or more first functional monomers selected from compounds having a first functional group which may react with a hydrazino group (e.g., a hydrazine-based crosslinking agent having a structural moiety represented by —NHNH$_2$, particularly —CONHNH$_2$). Such first functional monomer may have one or two or more (for example, one or two, typically one) first functional groups in the molecule. Examples of the first functional group include a keto group and an aldehyde group. It is particularly preferable to use a first functional monomer having at least one keto group in the molecule.

The first functional monomer is typically an ethylenically unsaturated monomer having one or two or more ethylenically unsaturated groups such as acryloyl group, methacryloyl group (hereinafter "(meth)acryloyl group" collectively refers to acryloyl and methacryloyl groups) and vinyl group in the molecule. The first functional monomer having good copolymerizability with alkyl(meth)acrylate can be preferably used. For example, an ethylenically unsaturated monomer having the first functional group and (meth)acryloyl group (more preferably acryloyl group) in the molecule can be preferably used as the first functional monomer.

Specific examples of ethylenically unsaturated monomers having aldehyde group include acrolein, methacrolein, formylstyrene or the like. Specific examples of ethylenically unsaturated monomers having keto group include: compounds having (meth)acryloyl group and keto group (e.g., acetyl group) in the molecule such as diacetone acrylamide, diacetone methacrylamide, diacetone acrylate, diacetone methacrylate, acetoacetoxymethyl(meth)acrylate, 2-(acetoacetoxy)ethyl(meth)acrylate (namely, acetoacetic acid ester of 2-hydroxyethyl(meth)acrylate), 2-acetoacetoxypropyl (meth)acrylate, butanediol-1,4-acrylate-acetylacetate (namely, acrylic acid 4-acetoxybutyl ester); vinyl alkyl ketones (e.g., vinyl-C$_{1-7}$ alkyl ketones) such as vinyl methyl ketone, vinyl ethyl ketone, and vinyl isobutyl ketone; and allyl acetoacetate, vinyl acetoacetate, vinyl acetoacetamido, and the like. One or two or more ethylenically unsaturated monomers selected from such ethylenically unsaturated monomers can be used as the first functional monomer. In terms of the reactivity toward hydrazine-based crosslinking agent set forth below, it is preferable to use a first functional monomer having —COCH$_3$ group (e.g., —CH$_2$COCH$_3$ group) in the molecule. Examples of the first functional monomers having —COCH$_3$ group include diacetone acrylamide, diacetone methacrylamide, diacetone acrylate, diacetone methacrylate, or the like. A particularly preferable example of the first functional monomer includes diacetone acrylamide.

The monomer raw material further contains one or two or more second functional monomers selected from compounds which may react with carbodiimide group (e.g., carbodiimide-based crosslinking agent having a structure represented by —N=C=N—). Such second functional monomer may have one or two or more (for example, one or two and typically one) second functional groups in the molecule. Examples of the second functional group include carboxyl group, amino group, and hydroxyl group (typically alcoholic hydroxyl group). It is particularly preferable to use the second functional monomer having at least one carboxyl group in the molecule.

The second functional monomer is typically an ethylenically unsaturated monomer having one or two or more ethylenically unsaturated groups such as (meth)acryloyl group and vinyl group in the molecule. The second functional monomer good copolymerizability with alkyl(meth)acrylate can be preferably used. For example, ethylenically unsaturated monomer having the second functional group and (meth) acryloyl group (more preferably acryloyl group) in the molecule can be preferably used as the second functional monomer.

Specific examples of ethylenically unsaturated monomers having carboxyl group include: ethylenically unsaturated monocarboxylic acids such as acrylic acid, methacrylic acid, crotonic acid; and ethylenically unsaturated dicarboxylic acids such as maleic acid, itaconic acid, citraconic acid, or the like, and anhydrides thereof. Specific examples of ethylenically unsaturated monomers having amino group include: N-alkylaminoalkyl (meth)acrylates such as N-methylaminoethyl(meth)acrylate, N-ethylaminoethyl (meth)acrylate, N-t-butylaminoethyl(meth)acrylate; and N,N-dialkylaminoalkyl (meth)acrylates such as N,N-dimethylaminoethyl(meth)acrylate, N,N-diethylaminoethyl(meth)acrylate. Specific examples of ethylenically unsaturated monomers having hydroxyl group include: hydroxyalkyl(meth)acrylates such as 2-hydroxyethyl(meth)acrylate, 2-hydroxypropyl(meth)acrylate, 3-hydroxypropyl (meth)acrylate and 2-hydroxybutyl(meth)acrylate; vinyl alcohol; allyl alcohol; N-methylolacrylamide and the like. One or two or more kinds of ethylenically unsaturated monomers selected from such ethylenically unsaturated monomers can be used as the second functional monomer. For example, the aforementioned ethylenically unsaturated monocarboxylic acids can be preferably used. In particular, it is preferable to use acrylic acid and/or methacrylic acid (particularly acrylic acid).

In a pressure-sensitive adhesive composition disclosed herein, the proportion of the first functional monomer in the total amount of the above monomer raw material (in other words, the copolymerization proportion of the first functional monomer in the above acrylic polymer) may be about 0.01 mass % or more (preferably about 0.1 mass % or more). For example, a monomer raw material containing the first functional monomer in the range of about 0.01 to 5 mass % (more preferably about 0.1 to 2 mass %) is preferred.

The proportion of the second functional monomer in the total amount of the monomer raw material (in other words, the copolymerization proportion of the second functional monomer in the above acrylic polymer) may be about 0.1 mass % or more (preferably about 0.5 mass % or more, and more preferably about 1 mass % or more). For example, it is preferable to use a monomer raw material containing the second functional monomer in the range of about 0.1 to 15 mass % (more preferably about 0.5 to 10 mass %, further more preferably about 1 to 10 mass %/.

Normally, the composition of such monomer raw material corresponds nearly to the copolymerization proportion of each monomer in the acrylic polymer obtained by polymerizing the monomer raw material. Note that a preferable copolymerization proportion of the first functional monomer may be determined in consideration of the amount of the hydrazine-based crosslinking agent (the component B) used, which is set forth below. Likewise, a preferable copolymerization proportion of the second functional monomer may be determined in consideration of the amount of the carbodiimide-based crosslinking agent (the component C) used, which is set forth below.

The monomer raw material can contain other monomer (copolymer component) as an optional component in addition to the aforementioned alkyl (meth)acrylate, the first functional monomer, and the second functional monomer. "Other monomer" may be one or two or more monomers selected from various kinds of ethylenically unsaturated monomers including: ethylenically unsaturated monomers having an amide group, such as (meth)acrylamide, N,N-dimethyl (meth)acrylamide, N-methoxymethyl (meth)acrylamide, N-butoxymethyl(meth)acrylamide; vinyl esters such as vinyl acetate and vinyl propionate; aromatic vinyl compounds such as styrene, α-methylstyrene, and vinyl toluene; (meth)acrylic esters of cyclic alcohols, such as cyclopentyl(meth)acrylate, cyclohexyl(meth)acrylate, and isobornyl(meth)acrylate; ethylenically unsaturated monomers having an epoxy group, such as glycidyl (meth)acrylate and allyl glycidyl ether; ethylenically unsaturated monomers having an alkoxysilyl group, such as 3-(meth)acryloyloxypropyltrimethoxysilane, 3-(meth)acryloyloxypropyltriethoxysilane, vinyltrimethoxysilane; polyfunctional (meth)acrylates such as ethylene glycol di(meth)acrylate, dipropylene glycol di(meth)acrylate, hexanediol di(meth)acrylate, neopentyl glycol di(meth)acrylate, trimethylolpropane tri(meth)acrylate, tetramethylolmethane tri(meth)acrylate, and dipentaerythritol hexa(meth)acrylate; ethylenically unsaturated monomers having a cyano group such as (meth)acrylonitrile; N-(meth)acryloylmorpholine; and N-vinyl-2-pyrrolidone. In a monomer raw material containing such "other monomer," the proportion of the other monomer (the total proportion in a case where the monomer raw material contains two or more kinds of other monomers) in the monomer raw material can be, for example, about 10 mass % or less. This proportion may be about 5 mass % or less of the monomer raw material.

Acrylic polymers as the component A of compositions disclosed herein are typically obtained by emulsion polymerization of the above monomer raw materials. Procedures for the emulsion polymerization are not particularly limited, and can be achieved in ways similar to conventionally known general procedures which appropriately employ, for example, various conventional methods for adding monomers, polymerization conditions (polymerization temperature, polymerization time, polymerization pressure or the like), and materials (polymerization initiator, surfactants or the like). For example, methods for adding monomers, can be employed any of charging-in-one-portion methods (where the entire monomer raw material is introduced into the polymerization reactor at one time), gradual addition methods, portion-wise addition methods, or the like. A portion or the whole amount of monomer raw material may be emulsified in advance, and then the emulsion may be supplied to the reactor.

A temperature of, for example, 20 to 100° C. (typically 40 to 80° C.) can be employed as the polymerization temperature. Examples of polymerization initiators include, but are not limited to, azo initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane]dihydrochloride, 2,2'-azobis(N,N'-dimethyleneisobutylamidine), or 2,2'-azobis[N-(2-carboxyethyl)-2-methylpropionamidine]hydrate; persulfates such as potassium persulfate or ammonium persulfate; peroxide initiators such as benzoyl peroxide, t-butyl hydroperoxide or hydrogen peroxide; and redox initiators such as combinations of a persulfate and sodium hydrogen sulfite or combinations of a peroxide and sodium ascorbate. The amount of the polymerization initiator used is, for example, from about 0.005 to 1 part by mass with respect to 100 parts by mass of the monomer raw material.

Examples of emulsifying agents include anionic emulsifying agents such as sodium lauryl sulfate, ammonium lauryl sulfate, sodium dodecylbenzenesulfonate, sodium polyoxyethylene alkyl ether sulfates, ammonium polyoxyethylene alkylphenyl ether sulfates, or sodium polyoxyethylene alkylphenyl ether sulfates; and nonionic emulsifying agents such as polyoxyethylene alkyl ethers or polyoxyethylene alkylphenyl ethers. These emulsifying agents may be used alone or in combination of two or more kinds thereof. The amount of the emulsifying agent used is, for example, from about 0.2 to 10 parts by mass (preferably from about 0.5 to 5 parts by mass) with respect to 100 parts by mass of the monomer raw material.

Various conventional chain transfer agents may be, where applicable, used for the polymerization. Such chain transfer agents may be one or two or more kinds selected from mercaptans, such as dodecyl mercaptan (dodecanethiol), glycidyl mercaptane, 2-mercaptoethanol, mercaptoacetic acid, 2-ethylhexyl thioglycolate, or 2,3-dimethylcapto-1-propanol. The amount of the chain transfer agent used is, for example, from about 0.001 to 0.5 part by mass with respect to 100 parts by mass of the monomer raw material.

Although not limited to, an acrylic polymer obtained by such emulsion polymerization may have, for example, the mass ratio of the ethyl acetate insoluble matter (the ethyl acetate insoluble content or gel fraction) of less than about 15 mass %, which was remained after the polymer is extracted with ethyl acetate. When the polymer is extracted with THF, the weight average molecular weight of the THF soluble content (the THF soluble matter) in terms of standard polystyrene may be, for example, about $50 \times 10^4$ to $90 \times 10^4$. An acrylic polymer of which gel fraction and/or weight average molecular weight of the THF soluble content are in the above ranges may be crosslinked by a hydrazine-based crosslinking agent and a carbodiimide-based crosslinking agent to provide a pressure-sensitive adhesive layer with higher performance.

Note that the acrylic polymer contained in the aqueous pressure-sensitive adhesive compositions disclosed herein is not limited to ones obtained by emulsion polymerization. The pressure-sensitive adhesive compositions may be formed by dispersing the acrylic polymer, which is obtained by, for example, solution polymerization, photo polymerization, bulk polymerization, or the like, into water using an emulsifier where appropriate.

The hydrazine-based crosslinking agent as the component B constituting the composition disclosed herein may typically be various hydrazide compounds (e.g., acid hydrazide compounds having a structural moiety represented by —$CONHNH_2$) having two or more (for example, two to four, and typically two) hydrazino groups (—$NHNH_2$) in the molecule as the crosslinkable functional group. Examples of such hydrazide compounds include: saturated dicarboxylic acid dihydrazides, such as oxalic acid dihydrazide, malonic acid dihydrazide, succinic acid dihydrazide, glutaric acid dihydrazide, adipic acid dihydrazide, pimelic acid dihydrazide, or sebacic acid dihydrazide; unsaturated dicarboxylic acid dihydrazides such as maleic acid dihydrazide, fumaric acid dihydrazide, or itaconic acid dihydrazide; and the like. Only one compound selected from such hydrazide compounds may be used, or two or more compounds may be used in combination. Among these compounds, preferable examples are glutaric acid dihydrazide, adipic acid dihydrazide, and pimelic acid dihydrazide. Although not particularly limited to, it is preferable to use a hydrazide compound of which chemical formula weight per hydrazino group is approximately 70 to 100 in terms of reactivity and operatability. For example, adipic acid dihydrazide may be preferably used.

Such hydrazine-based crosslinking agent is typically used by adding to water dispersion of acrylic polymer. Preferably, for example, to an water dispersion of acrylic polymer (acrylic polymer emulsion) prepared from an above-mentioned monomer raw material via emulsion polymerization, was added and mixed a hydrazine-based crosslinking agent. Procedures for adding a hydrazine-based crosslinking agent is not particularly limited. For example, a hydrazine-based crosslinking agent may be added as is (typically in solid state, and for example as a powder), as a hydrazine-based crosslinking agent solution (e.g., an aqueous solution) made by dissolving a hydrazine-based crosslinking agent into an appropriate solvent, or as aqueous dispersion (e.g., emulsion) where a hydrazine-based crosslinking agent or an organic solvent solution thereof is dispersed in water.

A carbodiimide-based crosslinking agent as the component C constituting the compositions disclosed herein may typically be a various carbodiimide compounds (polycarbodiimide compounds) having one or two or more (for example, two to ten) carbodiimide groups (—N═C═N—) in the molecule as the crosslinkable functional group. In addition, since carbodiimide (HN═C═NH) is tautomeric with cyanamide (NC—NH$_2$), the notion of carbodiimide-based crosslinking agent described herein includes compounds having one or two or more cyanamide groups (NC—NH—) in the molecule, and compounds having, a total of two or more of cyanamide group(s) (NC—NH—) and carbodiimide group (s) (—N═C═N—) in the molecule. Therefore, a carbodiimide-based crosslinking agent as the component (C) may be a compound having in the molecule one or two or more crosslinkable functional groups selected from carbodiimide group (—N═C═N—) and cyanamide group (NC—NH—). Only one kind selected from such compounds may be used, or two or more kinds may be used in combination.

The above carbodiimide-based crosslinking agent may be a carbodiimide compound having the structural moiety represented by, for example, the following chemical formula (2):

$$—(R^{11}—N═C═N)_n— \quad (2)$$

where $R^{11}$ is one or two or more kinds selected from: alkylene groups such as hexamethylene, 2,2,4-trimethylhexamethylene; bivalent organic groups having two alkyl groups bonded to an aromatic ring, such as xylylene represented by the chemical formula —CH$_2$—C$_6$H$_4$—CH$_2$— and tetramethylxylylene represented by —C(CH$_3$)$_2$—C$_6$H$_4$—C(CH$_3$)$_2$—; and bivalent organic groups having a cycloalkyl ring such as hydrogenated xylylene represented by —CH$_2$—C$_6$H$_{10}$—CH$_2$— and methylenebis-4,1-cyclohexylene represented by —C$_6$H$_{10}$—CH$_2$—C$_6$H$_{10}$— and the like. Carbodiimide compounds having such structural moiety may be manufactured by methods including, for example, decarboxylation condensation of the corresponding diisocyanate compounds. In the above formula (2), n is a value corresponding to the degree of polymerization (average degree of polymerization) in the decarboxylation condensation, and may be, for example, about 2 to 10. Although not particularly limited to, it is preferable to use a carbodiimide-based crosslinking agent of which chemical formula weight per crosslinkable functional group (typically carbodiimide group) is approximately 150 to 750 (preferably around 200 to 650 and more preferably around 300 to 600), in terms of reactivity and operatability.

Moreover, the above carbodiimide-based crosslinking agent may be a carbodiimide compound represented by, for example, the following chemical formula (3):

$$R^{21}—N═C═N—R^{22} \quad (3)$$

where each of $R^{21}$ and $R^{22}$ may be any group selected from: a hydrogen atom; alkyl groups such as propyl group; cycloalkyl groups such as cyclohexyl group; and monovalent organic groups containing an aromatic ring such as p-toluoyl group. Specific examples of such carbodiimide compounds include dicyclohexylmethane carbodiimide, dicyclohexyl carbodiimide, tetramethylxylylene carbodiimide, and urea-modified carbodiimides.

Examples of commercially available carbodiimide-based crosslinking agent that can be preferably used as the component C include the "Carbodilite" series available from Nis-shinbo Industries, Inc. Any of water-solution types of the series (e.g., "V-04," "V-02," and "V-02-L2"), emulsion types ("E-01" and "E-02"), solvent types ("V-01," "V-03," "V-07," and "V-09"), and the solventless type ("V-05") can be used as component C. Among these, water-solution types are preferably used; for example, "V-04" can be preferably used.

Such carbodiimide-based crosslinking agent is typically used by adding to water dispersion of acrylic polymer. Preferably, for example, to an water dispersion of acrylic polymer (acrylic polymer emulsion) prepared from an above-mentioned monomer raw material via emulsion polymerization, was added and mixed a carbodiimide-based crosslinking agent. Procedures for adding a carbodiimide-based crosslinking agent is not particularly limited. For example, a carbodiimide-based crosslinking agent may be added as is (typically in solid state, and for example as a powder), as a hydrazine-based crosslinking agent solution (e.g., an aqueous solution) made by dissolving a carbodiimide-based crosslinking agent into an appropriate solvent, or as aqueous dispersion (e.g., emulsion) where a carbodiimide-based crosslinking agent or an organic solvent solution thereof is dispersed in water.

Aqueous pressure-sensitive adhesive compositions disclosed herein contain an above-mentioned acrylic polymer (the component A) as the main component, and are compositions where the acrylic polymer is dispersed in water. Here, the phrase "contains an acrylic polymer . . . as the main component" means that the mass proportion of the acrylic polymer to the nonvolatiles (solid content) contained in the aqueous pressure-sensitive adhesive composition exceeds 50 mass %. The mass proportion of the acrylic polymer to the solid content of the composition may be more than 70 mass %. The proportion of the nonvolatiles to such aqueous pressure-sensitive adhesive composition (that is, the solid content of the composition) may be within the range of, for example, about 30 to 80 mass % (typically about 40 to 70 mass %).

The content (blend ratio) of hydrazine-based crosslinking agent (the component B) in the pressure-sensitive adhesive compositions disclosed herein can be, based on the nonvolatiles content, within the range of about 0.001 to 1 part by mass with respect to 100 parts by mass of the acrylic polymer (the component A). If the content is too low, the cohesive strength of the pressure-sensitive adhesive is likely to be insufficient. If the content is too high, the pressure-sensitive adhesive force (adhesive strength) is likely to be insufficient. A pressure-sensitive adhesive composition containing about 0.02 to 0.2 part by mass of the hydrazine-based crosslinking agent with respect to 100 parts by mass of the acrylic polymer may provide pressure-sensitive adhesive layers with higher performance in combination with the use of the carbodiimide-based crosslinking agent.

The content (blend ratio) of carbodiimide-based crosslinking agent (the component C) can be, based on the nonvolatiles content, within the range of about, for example, 0.01 to 1 part by mass with respect to 100 parts by mass of the acrylic polymer (the component A). If the content is too low, the cohesive strength of the pressure-sensitive adhesive is likely to be insufficient. If the content is too high, the pressure-sensitive adhesive force (adhesive strength) is likely to be insufficient. A pressure-sensitive adhesive composition containing about 0.05 to 0.5 part by mass of the carbodiimide-based crosslinking agent with respect to 100 parts by mass of the acrylic polymer may provide pressure-sensitive adhesive layers with higher performance in combination with the use of a hydrazine-based crosslinking agent.

Although not particularly limited to, the total content of hydrazine-based crosslinking agent and carbodiimide-based crosslinking agent can be within the range of about 0.02 to 2 parts by mass with respect to 100 parts by mass of the acrylic polymer. If the total content is too low, the cohesive strength of the pressure-sensitive adhesive is likely to be insufficient. If the content is too high, the pressure-sensitive adhesive force (adhesive strength) and tackiness (stickiness) are likely to be insufficient. The pressure-sensitive adhesive composition having the total content of hydrazine-based crosslinking agent and carbodiimide-based crosslinking agent in the range of about 0.1 to 1 part by mass (preferably about 0.1 to 0.5 part by mass) with respect to 100 parts by mass of the acrylic polymer may provide pressure-sensitive adhesive layers with higher performance.

A preferred content of the hydrazine-based crosslinking agent may also be determined with respect to the amount (the number of moles) of the first functional group of the acrylic polymer contained in the composition. Specifically, is preferred a pressure-sensitive adhesive composition containing hydrazine-based crosslinking agent at a ratio such that the number of moles of the first functional group (typically keto group) contained in the acrylic polymer is about 1.2 times or more (e.g., about 1.2 to 150 times, preferably about 1.2 to 100 times), preferably about 1.5 times or more (typically about 1.5 to 50 times, e.g., about 1.5 to 15 times), more preferably about 2 times or more (e.g., about 2 to 10 times) the number of moles of the crosslinkable functional group (hydrazino group) contained in the hydrazine-based crosslinking agent. The copolymerization ratio of the first functional monomer and/or the blend ratio of the hydrazine-based crosslinking agent may be determined to meet such ratio (the molar ratio between the hydrazino group and the first functional group).

Moreover, the preferable content of carbodiimide-based crosslinking agent may also be determined with respect to the amount (the number of moles) of the second functional group of the acrylic polymer contained in the composition. Specifically, is preferred a pressure-sensitive adhesive composition containing carbodiimide-based crosslinking agent at a ratio such that the number of moles of the second functional group (e.g., carboxyl group) contained in the acrylic polymer is about 2 times or more (e.g., about 2 to 2000 times), preferably about 10 times or more (typically about 10 to 1000 times, e.g., about 10 to 300 times), more preferably about 30 times or more (e.g., about 30 to 200 times) the number of moles of the crosslinkable functional group (carbodiimide group) contained in the carbodiimide-based crosslinking agent. The copolymerization ratio of the second functional monomer and/or the blend ratio of the carbodiimide-based crosslinking agent may be determined to meet such ratio (the molar ratio between the carbodiimide group and the second functional group).

In general, the reactivity between carboxyl group and carbodiimide group is significantly greater than the reactivity between amino group or hydroxyl group and carbodiimide group. Therefore, in a pressure-sensitive adhesive composition where is present a sufficient amount of the carboxyl group (for example, the number of moles is at least two times or more, and preferably about 10 times or more) with respect to the number of moles of the carbodiimide group contained in the carbodiimide-based crosslinking agent, the crosslinking reaction by the carbodiimide-based crosslinking agent is considered to proceed mainly between the carbodiimide group and the carboxyl group. In such a case, even when the monomer raw material is of a composition containing a hydroxyl group-containing monomer and/or an amino group-containing monomer in addition to a carboxyl group-containing monomer, it is considered that the actual contributor as the second functional monomer is mainly just the carboxyl group-containing monomer. Therefore, the hydroxyl group-containing monomer and the amino group-containing monomer contained in the monomer raw material may be regarded as the above-mentioned "other monomers." In one preferred embodiment of the pressure-sensitive adhesive compositions disclosed herein, the number of moles of the carboxyl group contained in the acrylic polymer is about 10 to 300 times (preferably 30 to 200 times) the number of moles of carbodiimide group contained in the carbodiimide-based crosslinking agent.

The pressure-sensitive adhesive composition disclosed herein may contain a hydrazine-based crosslinking agent and a carbodiimide-based crosslinking agent at a ratio such that the molar ratio between the hydrazino group contained in the hydrazine-based crosslinking agent and the carbodiimide group contained in the carbodiimide-based crosslinking agent (hydrazino group:carbodiimide group) is about 1:0.1 to 1:100. The composition contains the hydrazine-based crosslinking agent and the carbodiimide-based crosslinking agent preferably at the molar ratio of about 1:0.2 to 1:5 (in other words, the number of moles of the carbodiimide group contained in the carbodiimide-based crosslinking agent is about 0.2 to 5 times the number of moles of the hydrazino group contained in the hydrazine-based crosslinking agent), and more preferably at the molar ratio of about 1:0.2 to 1:3. The blend ratio of the hydrazine-based crosslinking agent and the carbodiimide-based crosslinking agent may be determined to meet such molar ratio.

Although not particularly limited to, the pressure-sensitive adhesive composition disclosed herein may be a pressure-sensitive adhesive composition containing the hydrazine-based crosslinking agent and the carbodiimide-based crosslinking agent at a ratio such that the total number of moles of the hydrazino group and the carbodiimide group contained in the crosslinking agents thereof is about 0.5 to 5 millimole (e.g., about 1 to 2 millimole) with respect to 100 g of the acrylic polymer.

In addition, the invention disclosed herein includes a method for producing an aqueous pressure-sensitive adhesive composition set forth below. The production method is a method for producing an aqueous pressure-sensitive adhesive composition wherein an acrylic polymer serves as the main component and the acrylic polymer is dispersed in water, the method including:

preparing water dispersion (typically emulsion) of acrylic polymer obtained by polymerizing a monomer raw material containing alkyl(meth)acrylate as the main monomer, a first functional monomer having a first functional group to react with a hydrazino group, and a second functional monomer having a second functional group to react with a carbodiimide group;

determining a blending quantity of the hydrazine-based crosslinking agent;

determining a blending quantity of the carbodiimide-based crosslinking agent; and blending the determined amounts of the hydrazine-based crosslinking agent and the carbodiimide-based crosslinking agent into the above-mentioned water dispersion. By applying such method, any of the aqueous pressure-sensitive adhesive compositions disclosed herein can be efficiently produced. The blending quantity of the hydrazine-based crosslinking agent and the carbodiimide-based crosslinking agent may be determined such that one or two or more of the blend ratio of each crosslinking agent with respect to 100 parts by mass of the acrylic polymer, the molar ratio between the hydrazino group and the first functional group, the molar ratio between the carbodiimide group and the second functional group, and the molar ratio between the hydrazino group and the carbodiimide group is in the above preferable range.

The pressure-sensitive adhesive composition disclosed herein may further contain a tackifier in addition to the above components A to C. As such tackifier, one or two or more kinds selected from various tackifier resins such as rosin-based resins, rosin derivative resins, petroleum resins, terpene-based resins, phenolic-based resins, or ketone-based resins. Examples of the above rosin-based resins include rosins such as gum rosin, wood rosin and tall-oil rosin; stabilized rosins (for example, stabilized rosins made by subjecting the rosins to disproportionation or hydrogenation), polymerized rosins (for example, multimer, typically dimer of the rosins), modified rosins (for example, unsaturated acid-modified rosins where the rosin is modified by unsaturated acids such as maleic acid, fumaric acid, or (meth)acrylic acid), and the like. Examples of the above rosin derivative resins include ester modified rosin-based resins, phenol modified rosin-based resins and esterified compounds thereof, and the like. Examples of the above petroleum resins include aliphatic petroleum resins, aromatic petroleum resins, copolymer petroleum resins, alicyclic petroleum resins, hydrides thereof, and the like. Examples of the terpene-based resins include α-pinene resins, β-pinene resins, aromatic modified terpene resins, terpene-phenol resins, and the like. Examples of the ketone-based resins include ketone-based resins obtained by condensation of ketones (for example, aliphatic ketone such as methyl ethyl ketone, methyl isobutyl ketone, or acetophenone; and alicyclic ketones such as cyclohexanone, or methylcyclohexanone) and formaldehyde.

For example, a tackifier having a softening point of about 140° C. or higher (typically 140 to 180° C.) may be employed in terms of increasing the cohesive strength under the high temperature environment. Examples of a commercially available tackifier having such softening point include, but not limited to, trade names "Super Ester E-865," "Super Ester E-865NT," "Super Ester E-650," "Super Ester E-786-60," "Tamanol E-100," "Tamanol E-200," "Tamanol 803L," "Pensel D-160," "Pensel KK" available from Arakawa Chemical Industries, Ltd.; and trade names "YS Polyster S," "YS Polyster T," "Mighty Ace G" available from Yasuhara Chemical Co., Ltd. By employing a tackifier having a softening point of about 160° C. or higher (typically 160 to 180° C.), a pressure-sensitive adhesive composition providing higher performance pressure-sensitive adhesive layers may be provided. For example, a pressure-sensitive adhesive achieving a better performance balance between the cohesive strength under high temperature conditions and one or two or more of other properties (e.g., pressure-sensitive adhesive force) at a greater level may be provided. Such tackifiers may be used alone or in combination of two or more kinds thereof.

Such tackifier is typically used by adding to water dispersion of acrylic polymer. Preferably, for example, to an water dispersion of acrylic polymer (acrylic polymer emulsion) prepared from an above-mentioned monomer raw material via emulsion polymerization, was added and mixed a tackifier. Methods for adding the tackifier are not particularly limited. In general, the tackifier is appropriately added in the form of water dispersion (tackifier emulsion) where the tackifier is dispersed in water.

The tackifier content (blend ratio) can be, based on the nonvolatiles content (solid content), for example, about 100 parts by mass or less with respect to 100 parts by mass of the acrylic polymer (the component A). In general, the content is appropriately about 50 parts by mass or less (for example, about 10 to 50 parts by mass). The lower limit of the tackifier content is not particularly limited. However, in general, when the tackifier content is about 1 part by mass or more with respect to 100 parts by mass of the acrylic polymer, a better result can be obtained.

As an optional component, a polymer component other than the above component A can be blended with the pressure-sensitive adhesive compositions disclosed herein. Such polymer component is preferably a polymer having the properties of rubber or elastomer, and examples thereof include ethylene vinyl acetate copolymer, acrylic rubber, natural rubber (NOR), isoprene rubber (IR), styrene butadiene rubber (SBR), chloroprene rubber (CR), butyl rubber (IIR), ethylene propylene rubber (EPM, EPDM), polyisobutylene, styrene-ethylene-butylene-styrene copolymer (SEBS), acrylonitrile-butadiene copolymer (NBR), styrene-butadiene-styrene block copolymers (SBS), styrene-isoprene-styrene block copolymers (SIS), polyvinyl alkyl ether (for example, polyvinyl isobutyl ether), and the like. These polymer components may be used alone or in combination of two or more kinds thereof.

Such polymer component, for example, in the form of emulsion where the polymer component is dispersed in water, may be used by blending with the water dispersion of the above acrylic polymer. In general, the content (blend ratio) of the polymer component is, based on the nonvolatiles (solid content), appropriately about 50 parts by mass or less (for example, about 5 to 50 parts by mass) with respect to 100 parts by mass of the acrylic polymer (the component A).

An aforementioned pressure-sensitive adhesive composition may contain an acid or a base (ammonia water or the like) which is used for the purpose of adjusting the pH or the like. As for examples of other optional components which may be contained in the composition, various additives common in the field of the aqueous pressure-sensitive adhesive composition are included such as viscosity modifiers, leveling agents, plasticizers, fillers, colorants such as pigments and dyes, stabilizers, antiseptic agents, and antiaging agents. Moreover, the composition disclosed herein can further contain crosslinking agents other than the above components B and C upon necessity unless the effect of the present invention is not significantly reduced. Examples of the crosslinking agents include isocyanate crosslinking agents, epoxy crosslinking agents, oxazoline crosslinking agents, aziridine crosslinking agents, and metal chelate crosslinking agents. As such additives, crosslinking agents or the like, conventionally known agents can be used by common methods, and because they do not characterize specifically the present invention, detailed descriptions thereof are omitted.

The pressure-sensitive adhesive sheet according to the present invention comprises a pressure-sensitive adhesive layer formed using any pressure-sensitive adhesive composition disclosed herein. The pressure-sensitive adhesive sheet may be a pressure-sensitive adhesive sheet with a substrate which has such pressure-sensitive adhesive layer on one or both surfaces of a sheet-like substrate (support), or a substrate-free pressure-sensitive adhesive sheet which has the pressure-sensitive adhesive layer on the release liner. The notion of the pressure-sensitive adhesive sheet described herein may contain pressure-sensitive adhesive sheets called pressure-sensitive adhesive tape, pressure-sensitive adhesive label, pressure-sensitive adhesive film. The pressure-sensitive adhesive layer is not limited to a continuously formed pressure-sensitive adhesive layer, and may be a pressure-sensitive adhesive layer formed in a regular or random pattern such as a dotted pattern, a stripe pattern, and the like.

Figure 1:
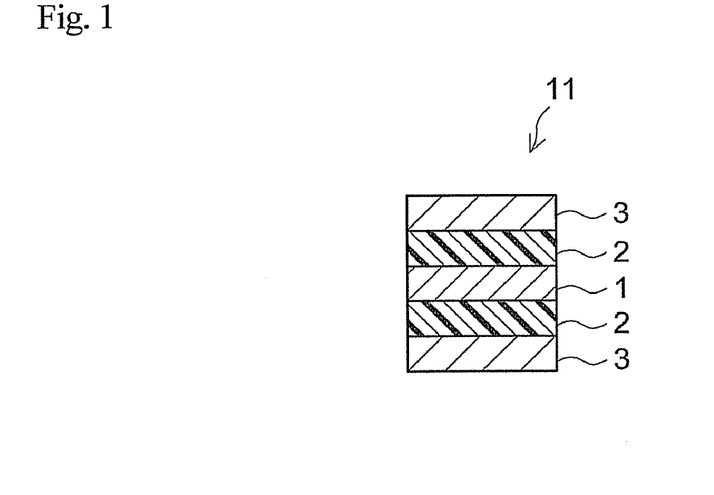
FIGS. 1 and 2 show cross-sectional views each schematically illustrating a configuration example of a pressure-sensitive adhesive sheet according to the present invention.
Figure 2:
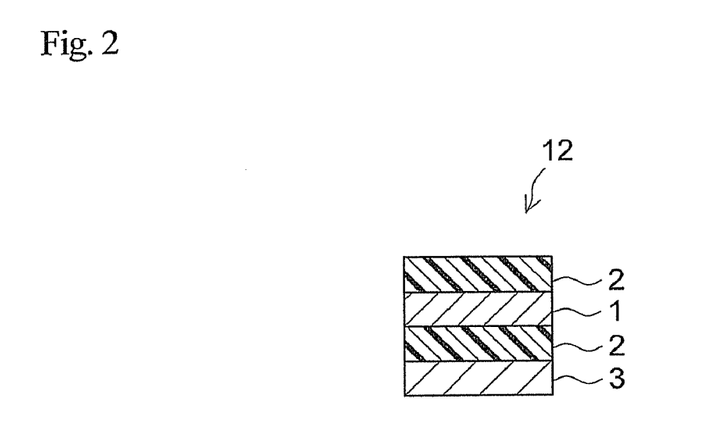

The pressure-sensitive adhesive sheet disclosed herein may have a cross sectional structure schematically shown in FIGS. 1 to 6. FIGS. 1 and 2 show configuration examples of a double-faced pressure-sensitive adhesive type of pressure-sensitive adhesive sheet with a substrate. Pressure-sensitive adhesive sheet 11 shown in FIG. 1 has pressure-sensitive adhesive layer 2 on both surfaces of substrate 1, and has a configuration where each pressure-sensitive adhesive layer 2 is protected by release liner 3 of which at least the side on the pressure-sensitive adhesive layer serves as a release surface. Pressure-sensitive adhesive sheet 12 shown in FIG. 2 has pressure-sensitive adhesive layer 2 on both surfaces of substrate 1, and has a configuration where one of the pressure-sensitive adhesive layers is protected by release liner 3 of which both surfaces serve as the release surface. Such pressure-sensitive adhesive sheet 12 can be, upon winding pressure-sensitive adhesive sheet 12, configured such that the other pressure-sensitive adhesive layer is abutted against the rear surface of release liner 3, so the other pressure-sensitive adhesive layer is also protected by the release liner 3.

Figure 3:
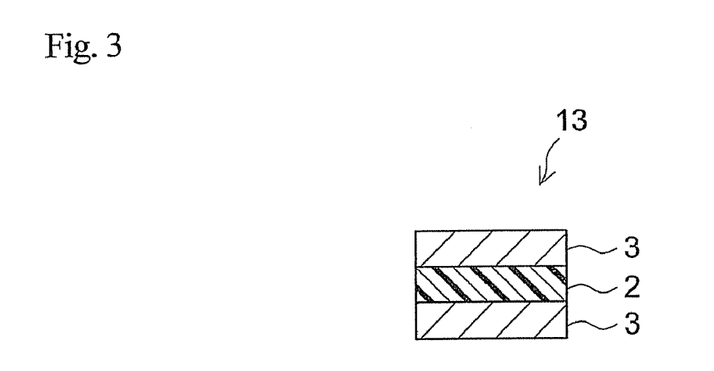
FIGS. 3 and 4 show cross-sectional views each schematically illustrating a configuration example of a pressure-sensitive adhesive sheet according to the present invention.
Figure 4:
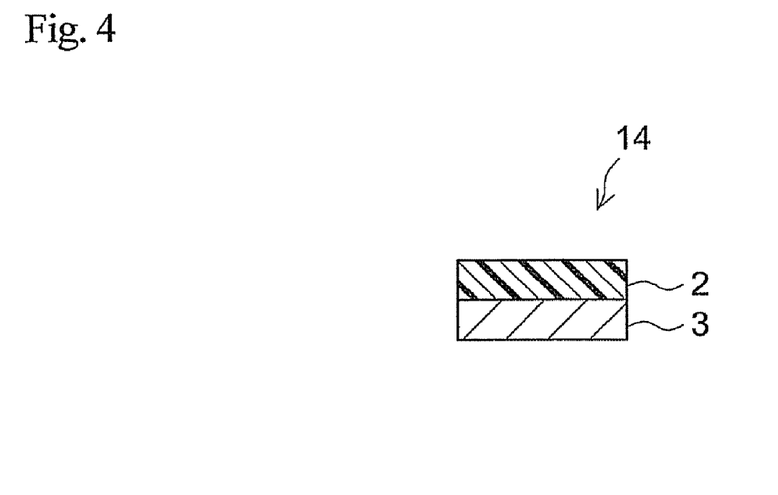

FIGS. 3 and 4 show configuration examples of substrate-free pressure-sensitive adhesive tape. Pressure-sensitive adhesive sheet 13 shown in FIG. 3 has a configuration where each surface of substrate-free pressure-sensitive adhesive layer 2 is protected by release liner 3 of which at least the side on the pressure-sensitive adhesive layer serves as the release surface. Pressure-sensitive adhesive sheet 14 shown in FIG. 4 has a configuration where one surface of substrate-free pressure-sensitive adhesive layer 2 is protected by release liner 3 of which both surfaces serve as the release surface, and in which upon winding of the pressure-sensitive adhesive sheet, the other surface of pressure-sensitive adhesive layer 2 is abutted against the release liner 3 and so is also protected by release liner 3.

Figure 5:
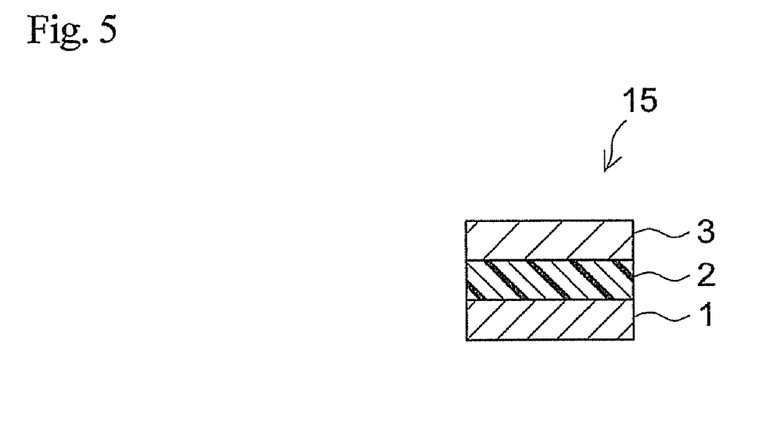
FIGS. 5 and. 6 show cross-sectional views each schematically illustrating a configuration example of a pressure-sensitive adhesive sheet according to the present invention.
Figure 6:
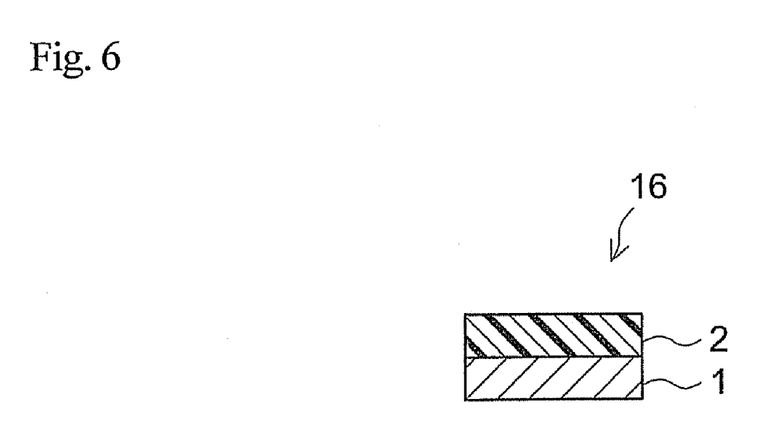

FIGS. 5 and 6 show configuration examples of a single-faced pressure-sensitive adhesive type of pressure-sensitive adhesive sheet with a substrate. Pressure-sensitive adhesive sheet 15 shown in FIG. 5 has pressure-sensitive adhesive layer 2 on one surface of substrate 1, and has a configuration where the surface (adhesive surface) of pressure-sensitive adhesive layer 2 is protected by release liner 3 of which at least the side on the pressure-sensitive adhesive layer serves as the release surface. Pressure-sensitive adhesive sheet 16 shown in FIG. 6 has pressure-sensitive adhesive layer 2 on one surface of substrate 1. The other surface of substrate 1 serves as the release surface, and upon winding the pressure-sensitive adhesive sheet 16, the other surface is abutted against pressure-sensitive adhesive layer 2 and the surface (adhesive surface) of the pressure-sensitive adhesive layer is protected by the other surface of substrate 1.

As the substrate constituting such pressure-sensitive adhesive sheet, depending on the application of the pressure-sensitive adhesive sheet, an appropriate substrate can be chosen and used from, for example, plastic films such as polypropylene films, ethylene/propylene copolymer films, polyester films or poly(vinyl chloride) films; foam substrates such as polyurethane foams or polyethylene foams; papers such as craft paper, crepe paper or Japanese paper; fabrics such as cotton fabrics or staple-fiber fabrics; nonwoven fabrics such as polyester nonwoven fabrics or vinylon nonwoven fabrics; and metal foils such as aluminum foils or copper foils. Either unstretched films or stretched (uniaxially stretched or biaxially stretched) films can be used as the plastic film. The side of the substrate to which the pressure-sensitive adhesive layer is applied may have undergone surface treatments such as a primer coating or a corona discharge treatment. Although the thickness of the substrate may be suitably selected according to the applications, it is generally about 10 μm to 500 μM (typically 10 μm to 200 μM).

The pressure-sensitive adhesive layers may be formed by, for example, applying (typically by coating) any of the aqueous pressure-sensitive adhesive compositions disclosed herein onto a substrate or a release liner and drying the composition. The pressure-sensitive adhesive composition can be applied onto the substrate with an conventional coater such as a gravure roll coater, a reverse-roll coater, a kiss-roll coater, a dip roll coater, a bar coater, a knife coater or a spray coater. Although not particularly limited to, the coating thickness of the pressure-sensitive adhesive composition can be that the thickness of the pressure-sensitive adhesive layer formed upon drying is, for example, about 2 μm to 150 μm (typically about 5 μm to 100 μm). In terms of accelerating the crosslinking reaction and improving the productivity or the like, the pressure-sensitive adhesive composition is preferably dried with heating. Though depended on the types of the substrate, normally a drying temperature of, for example, about 40 to 120° C. can be employed. In the case of the pressure-sensitive adhesive sheet with a substrate, the pressure-sensitive adhesive layer may be formed by directly applying the pressure-sensitive adhesive composition onto the substrate, and the pressure-sensitive adhesive layer formed on the release liner may be transferred to the substrate.

The pressure-sensitive adhesive (namely, the post-crosslinking pressure-sensitive adhesive) constituting the pressure-sensitive adhesive layer obtained in this manner may be a pressure-sensitive adhesive of which the mass ratio of the ethyl acetate insoluble matter (the ethyl acetate insoluble content or gel fraction) remained after extraction of the pressure-sensitive adhesive with ethyl acetate is about 15 mass % or more but 70 mass % or less. The pressure-sensitive adhesive layer of which the pressure-sensitive adhesive has a gel fraction of 20 mass % or more but 50 mass % or less may achieve the better balance between various properties (e.g., the adhesive strength and the cohesive strength) at a higher level. Although not particularly limited to, the weight average molecular weight of the soluble content in the extraction with THF may be, for example, about $10\times10^4$ to $80\times10^4$ (preferably about $20\times10^4$ to $60\times10^4$) in terms of standard polystyrene.

The pressure-sensitive adhesive sheet provided by the present invention may be a high-performance pressure-sensitive adhesive sheet which simultaneously realizes the plurality of properties at a high level. For example, the pressure-sensitive adhesive sheet may be a pressure-sensitive adhesive sheet realizing both the pressure-sensitive adhesive force and the cohesive strength (particularly, the cohesive strength under high-temperature conditions) at a higher level and in a well-balanced manner. Here, the cohesive strength under high-temperature conditions can be evaluated by, for example, measuring the holding power (the high-temperature holding power) at 80° C. as set forth below. According to one preferred embodiment of the pressure-sensitive adhesive sheet disclosed herein, in addition to the pressure-sensitive adhesive force and the cohesive strength, at least in either (preferably both) of repulsion resistance (edge peeling) and repulsion characteristics of the pressure-sensitive adhesive sheet having a foam substrate (hereinafter referred as "foam repulsion characteristics"), excellence may be achieved. The repulsion resistance is a property that may serve as an index or a guideline indicating the adhesiveness of a pressure-sensitive adhesive sheet to a curved surface or the like (the ability to adhere following the surface shape of adherend), and may be identified, for example, by a repulsion resistance test set forth below. The foam repulsion characteristics are characteristics that may be an index indicating the rough surface adhesive property of a pressure-sensitive adhesive sheet, and may be identified, for example, by a foam repulsion characteristics test set forth below.

The reason why such excellent effects are exhibited is not necessarily known, but is assumed as follows. The pressure-sensitive adhesive composition disclosed herein employs a combination of a hydrazine-based crosslinking agent and a carbodiimide-based crosslinking agent in an aqueous dispersion type (typically emulsion type) pressure-sensitive adhesive composition where an acrylic polymer is dispersed in water. A first functional group to react with the hydrazine-based crosslinking agent and a second functional group to react with the carbodiimide-based crosslinking agent are incorporated into the acrylic polymer. Here, the first functional group (typically keto group) and the second functional group (typically carboxyl group) differ greatly in their hydrophilicity. For example, in an aqueous acrylic polymer emulsion, the carboxyl group having high hydrophilicity is likely to gather around the surface (near the interface to the aqueous phase) of emulsion particles. The keto group having lower hydrophilicity is likely to be distributed inside the particles. By blending a combination of a hydrazine-based crosslinking agent and a carbodiimide-based crosslinking agent with such acrylic polymer emulsion, the balance between the crosslink density within the emulsion particle and that between the emulsion particles can be optimized (typically more highly uniformed). This seems to allow higher performance of the pressure-sensitive adhesive layer formed from the composition to be realized.

EXAMPLES

Hereinafter, some examples relating to the present invention will be described, but the present invention is not intended to be limited to the examples. Note that the terms "part" and "%" in the following description is based on mass unless otherwise stated.

Weight average molecular weights were measured in terms of standard polystyrene using Gel Permeation Chromatography (GPC) (manufactured by Tosoh Corporation), model name of "HLC-8120GPC" under the following conditions:
[Conditions for Molecular Weight Measurement]
Sample Concentration: 0.2% (THF Solution)
Sample Injection Amount: 10 μl
Eluant: THF
Flow Rate: 0.6 ml/min.
Measurement Temperature: 40° C.
Column: TSKgel GMH-H(S)
Detector: differential refractive index detector Example 1

Into a reactor equipped with a condenser, nitrogen inlet, thermometer and stirrer, were introduced 0.1 part 2,2'-azobis [N-(2-carboxyethyl)-2-methylpropionamidine]hydrate (polymerization initiator) (a trade name "VA-057" available from Wako Pure Chemical Industries, Ltd. was used) and 35 part ion exchanged water, and the resulting mixture was stirred for one hour under nitrogen. While kept at 60° C., thereto was gradually added dropwise over three hours an emulsion prepared by emulsifying 30 part butyl acrylate, 70 part 2-ethylhexyl acrylate, 4 part acrylic acid (the second functional monomer having carboxyl group as the second functional group), 0.5 part diacetone acrylamide (the first functional monomer having keto group as the first functional group, and hereinafter, sometimes referred to as "DAAM"), 0.04 part dodecanethiol (chain transfer agent) and 2 part sodium polyoxyethylene lauryl sulfate (emulsifying agent) with 40 part ion exchanged water (i.e., an emulsion of a monomer raw material), thus promoting emulsion polymerization. After the addition of the emulsion of the monomer raw material was completed, the mixture was further kept at the same temperature for three hours for aging. 10% ammonia water was added to adjust the pH of the emulsion to 7.5. In this manner, aqueous dispersion (emulsion) of the acrylic polymer (the component (A)) was obtained.

The weight of the solid matter ($W_1$ mg) obtained by drying an appropriate amount of the acrylic polymer emulsion (hereinafter, sometimes referred to as "acrylic polymer emulsion (I)" at room temperature was measured. In addition, the solid matter obtained above was immersed in ethyl acetate at room temperature for 7 days. Thereafter, the insoluble matter was taken out and dried at 130° C. for 2 hours. The weight of the dried insoluble matter ($W_2$ mg) was measured. When these measured values were substituted into the following formula, the mass ratio of the ethyl acetate insoluble matter (the ethyl acetate insoluble content or gel fraction) was determined to be about 9.6%.

Ethyl Acetate Insoluble Content (%)=$(W_2/W_1)\times 100$

Moreover, immersing the solid matter in THF at room temperature (typically 23° C.) for 7 days to elute the THF soluble content, and then filtering the THF insoluble matter off to prepare a sample (the THF solution containing the THF soluble content at the concentration of 0.2%) for the molecular weight measuring. The average molecular weight in terms of standard polystyrene was measured in the aforementioned manner, it was about $78.3 \times 10^4$.

To the acrylic polymer emulsion (I), an emulsion of a tackifier (trade name "Super Ester E-865NT", aqueous dispersion of a polymerized rosin resin having a softening point of 160° C., available from Arakawa Chemical Industries, Ltd. was used.) was added in proportion of 20 parts (based on the solid content) with respect to 100 parts of the acrylic polymer. Moreover, adipic acid dihydrazide (chemical formula weight per hydrazino group is about 87; hereinafter sometimes referred to as "ADH") was added as the hydrazine-based crosslinking agent (the component B) in proportion of 0.002 part for 100 part the acrylic polymer. Furthermore, trade name "Carbodilite V-04" product of Nisshinbo Industries, Inc. (a water-solution type of carbodiimide-based crosslinking agent containing a carbodiimide compound of which chemical formula weight per carbodiimide group is about 334; hereinafter sometimes referred to as "V-04") was added in proportion of 0.4 part (based on the solid content, and hereinafter calculated in the same manner) for 100 part acrylic polymer to obtain a pressure-sensitive adhesive composition according to Example 1.

The pressure-sensitive adhesive composition was applied to a release liner prepared by treating wood-free paper with a silicone release agent. The resultant was dried at 100° C. for 3 minutes so that the pressure-sensitive adhesive layer of about 70 μm in thickness was formed on the release liner, thereby obtaining a substrate-free pressure-sensitive adhesive sheet. In addition, a polyethylene terephthalate film (PET) of 38 μm in thickness was adhered to the pressure-sensitive adhesive layer to fabricate a pressure-sensitive adhesive sheet (PET substrate pressure-sensitive adhesive sheet) having the pressure-sensitive adhesive layer of 70 μM in thickness on PET substrate.

Example 2

The amount of ADH added to acrylic polymer emulsion (I) was 0.04 part with respect to 100 parts of the acrylic polymer and the amount of V-04 added was 0.3 part with respect to 100 parts of the acrylic polymer. Similarly to Example 1 in other regards, a pressure-sensitive adhesive composition according to Example 2 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

Example 3

The amount of ADH added to acrylic polymer emulsion (I) was 0.04 part with respect to 100 parts of the acrylic polymer. Similarly to Example 1 in other regards (namely, the amount of V-04 added was 0.4 part with respect to 100 parts of the acrylic polymer), and a pressure-sensitive adhesive composition according to Example 3 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

Example 4

The amount of ADH added to acrylic polymer emulsion (I) was 0.08 part with respect to 100 parts of the acrylic polymer and the amount of V-04 added was 0.2 part with respect to 100 parts of the acrylic polymer. Similarly to Example 1 in other regards, a pressure-sensitive adhesive composition according to Example 4 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

Example 5

The amount of ADH added to acrylic polymer emulsion (I) was 0.1 part with respect to 100 parts of the acrylic polymer and the amount of V-04 added was 0.1 part with respect to 100 parts of the acrylic polymer. Similarly to Example 1 in other regards, a pressure-sensitive adhesive composition according to Example 5 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

Comparative Example 1

In the present comparative example, was produced a pressure-sensitive adhesive composition containing proportionally the same amount of hydrazine-based crosslinking agent as in Example 5, but no carbodiimide-based crosslinking agent, and pressure-sensitive adhesive sheets were fabricated using the composition. Specifically, 0.1 part of ADH with respect to 100 parts of the acrylic polymer was added to acrylic polymer emulsion (I). No V-04 was added. Similarly to Example 1 in other regards, a pressure-sensitive adhesive composition according to Comparative Example 1 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

Comparative Example 2

Similarly to Comparative Example 1 except that the amount of ADH added to acrylic polymer emulsion (I) was 0.2 part, was prepared a pressure-sensitive adhesive composition containing hydrazine-based crosslinking agent but no carbodiimide-based crosslinking agent. Using this composition and following a protocol similar to Example 1, a substrate-free pressure-sensitive adhesive sheet and a pressure-sensitive adhesive sheet having the pressure-sensitive adhesive layer on PET substrate were fabricated.

Comparative Example 3

In the present comparative example, was produced a pressure-sensitive adhesive composition containing proportionally the same amount of carbodiimide-based crosslinking agent as in Examples 1 and 3, but no hydrazine-based crosslinking agent, and pressure-sensitive adhesive sheets were fabricated using the composition. Specifically, in the same manner as in Example 1 except that diacetone acrylamide (the first functional monomer) was omitted from the composition of the monomer raw material used in Example 1, emulsion polymerization was performed and 10% ammonia water was added to adjust the pH of the emulsion to 7.5. In this manner, aqueous dispersion (emulsion) of the acrylic polymer (the component (A)) was obtained.

For this acrylic polymer emulsion (hereinafter, sometimes referred to as "acrylic polymer emulsion (II)"), when the mass ratio of the ethyl acetate insoluble content and the average molecular weight of the THF soluble content were determined in a similar manner to the acrylic polymer emulsion (I), the mass ratio of the insoluble content was about 1.1% and the average molecular weight was about $81.3 \times 10^4$.

To acrylic polymer emulsion (II), was added 0.4 part of V-04 with respect to 100 parts of the acrylic polymer. No ADH was added. Similarly to Example 1 in other regards, a pressure-sensitive adhesive composition according to Comparative Example 3 was obtained. Using this composition and following a protocol similar to Example 1, a substrate-free pressure-sensitive adhesive sheet and a pressure-sensitive adhesive sheet having the pressure-sensitive adhesive layer on PET substrate were fabricated.

The substrate-free pressure-sensitive adhesive sheets (namely, the pressure-sensitive adhesive layer formed on the release liner) and the PET substrate pressure-sensitive adhesive sheets fabricated in each of the aforementioned Examples and Comparative Examples, were subjected to aging while being stored in an environment at 50° C. for three days from the time of their fabrication. Thereafter, they were subjected to the following evaluation test.

On the other hand, in each of the aforementioned Examples and Comparative Examples, an appropriate amount of sample was extracted from the pressure-sensitive adhesive layer constituting the substrate-free pressure-sensitive adhesive sheet after the aging, and the mass of the sample ($W_3$ mg) was measured. In addition, these samples were immersed in ethyl acetate at room temperature for 7 days. Thereafter, the insoluble matter was taken out and dried at 130° C. for 2 hours. The weight of the dried insoluble matter ($W_4$ mg) was measured. These measured values were substituted into the following formula to determine the mass ratio of the insoluble matter (the insoluble content or gel fraction).

Ethyl Acetate Insoluble Content (%)=($W_4/W_3$)×100

As a result, the mass ratio of the insoluble content was about 49.3% in the pressure-sensitive adhesive sheet according to Example 1, about 46.6% in Example 2, about 48.8% in Example 3, about 45.7% in Example 4, and about 44.6% in Example 5. Moreover, the mass ratio of the insoluble content was about 41.6% in the pressure-sensitive adhesive sheet according to Comparative Example 1, about 59.5% in Comparative Example 2, and about 46.4% in Comparative Example 3.

[Measurement of Pressure-Sensitive Adhesive Force]

The PET substrate pressure-sensitive adhesive sheet was cut into the size of 20 mm in width and 100 mm in length to prepare a test piece. To a SUS304 stainless plate as the adherend, the test piece was press-bonded by reciprocating a 2 kg roller once. The resultant was left at 23° C. for 30 minutes. Thereafter, adhesive strength (N/20 mm width) was measured using a tensile tester set at a pulling speed of 300 mm/min. and a release angle of 180° in a measurement environment at 23° C. with 50% relative humidity, in accordance with JIS Z0237.

[Measurement of High-Temperature (80° C.) Holding Power]

The PET substrate pressure-sensitive adhesive sheet was cut into the size of 10 mm in width and 100 mm in length to prepare a test piece. To a Bakelite plate as the adherend, the test piece was press-bonded by reciprocating a 2 kg roller once across the bonding area of 10 mm in width and 20 mm in length. The Bakelite plate was left hanging for 30 minutes in an environment at 80° C. Thereafter, a load of 500 g was applied to the free end of the test piece, and measured the duration of time (minute) until the test piece was dropped from the Bakelite plate in an environment at 80° C., in accordance with JIS Z0237.

[Repulsion Resistance Test]

A test piece was prepared by adhering the substrate-free pressure-sensitive adhesive sheet where the pressure-sensitive adhesive layer was provided on the release liner onto an aluminum sheet of 0.5 mm in thickness, 10 mm in width and 90 mm in length. The length of the test piece was curved in an arch around a round rod of φ50 mm in diameter. Thereafter, the release liner was stripped from the test piece to expose the pressure-sensitive adhesive layer and it was press-bonded to a polypropylene plate using a laminator. This was left in an environment at 23° C. for 24 hours, and then was heated at 70° C. for 2 hours. Thereafter, was measured the height (mm) of the end portion of the test piece lifted from the surface of the polypropylene plate.

[Foam Repulsion Characteristics Test]

The substrate-free pressure-sensitive adhesive sheet where the pressure-sensitive adhesive layer was provided on the release liner was bonded using a hand-roller onto urethane foam sheet (a trade name "ECS foam" available from Inoac Corporation) of 10 mm in thickness, and a test piece was prepared by cutting it into the size of 10 mm in width and 50 mm in length. The release liner was stripped from the test piece to expose the pressure-sensitive adhesive layer. By reciprocating a 2-kg roller once, the test piece was press-bonded in an area of 10 mm width and 10 mm in length onto one side of acrylonitrile-butadiene-styrene copolymer resin plate (ASB plate) of 2 mm in thickness. Next, the remaining portion of the test piece (10 mm in width and 40 mm in length) was bent over and bonded to the other side of the ABS plate. This was left in an environment at 23° C. for 24 hours and further left in an environment at 70° C. for 2 hours. Thereafter, the height (mm) of the end portion of the test piece lifted from the ABS plate at said one side (the side of the bonding area of 10 mm in width and 10 mm in length) was measured.

The results of the above evaluation tests are shown in Table 1 along with the approximate composition of the pressure-sensitive adhesive composition used for fabricating each pressure-sensitive adhesive sheet. In the table, "I" and "II" in Item "Emulsion Type" refer to the types of acrylic polymer emulsion used for producing each pressure-sensitive adhesive composition. The values in Item "—N=C=N—/—NHNH$_2$" refer to the molar ratios between the hydrazino group and the carbodiimide group contained in each pressure-sensitive adhesive composition. The values in Item "DAAM/—NHNH$_2$" refer to the molar ratios between the keto group derived from diacetone acrylamide and the hydrazino group contained in each pressure-sensitive adhesive composition.

TABLE 1

|  | Emulsion Type | ADH (part) | V-04 (part) | —N=C=N—/—NHNH$_2$ (molar ratio) | DAAM/—NHNH$_2$ (molar ratio) | Pressure-sensitive Adhesive Force [N/20 mm] | Holding Power [min.] | Repulsion Resistance [mm] | Foam Repulsion Characteristics [mm] |
|---|---|---|---|---|---|---|---|---|---|
| Ex. 1 | I | 0.002 | 0.4 | 52 | 131 | 14.0 | 56 | 0.9 | 5.0 |
| Ex. 2 | I | 0.04 | 0.3 | 2.0 | 6.5 | 14.0 | 1000 | 0.4 | 2.0 |
| Ex. 3 | I | 0.04 | 0.4 | 2.6 | 6.5 | 13.9 | 1714 | 1.0 | 4.7 |
| Ex. 4 | I | 0.08 | 0.2 | 0.65 | 3.3 | 15.8 | 1000 | 0.3 | 2.3 |
| Ex. 5 | I | 0.1 | 0.1 | 0.26 | 2.7 | 14.4 | 857 | 0.5 | 3.0 |
| CE 1 | I | 0.1 | — | — | 2.7 | 14.9 | 13 | 2.2 | 6.8 |
| CE 2 | I | 0.2 | — | — | 1.3 | 12.9 | 1714 | 0.9 | 9.0 |
| CE 3 | II | — | 0.4 | — | — | 15.5 | 36 | 0.9 | 10.0 |

Ex. = Example,
CE = Comparative Example

As shown in Table 1, all of the pressure-sensitive adhesive sheets according to Examples 1 to 5 satisfied both the pressure-sensitive adhesive force of 12N/20 mm or greater (more specifically, about 14N/20 mm or greater) and the high-temperature holding power of 50 minutes or more. In addition, all of the pressure-sensitive adhesive sheets according to there Examples exhibited excellent properties such that in the above repulsion resistance test, the height (end peeling height) of the end portion of the test piece lifted from the surface of the polypropylene plate was 2 mm or less (more specifically 1 mm or less) and in the above foam repulsion characteristics test, the height (foam peeling height) of the end portion of the test piece lifted from the ABS plate was 5 mm or less. In particular, the pressure-sensitive adhesive sheets according to Examples 2, 4 and 5 satisfied both the pressure-sensitive adhesive force of 14N/20 mm or greater and high-temperature holding power of 720 minutes (i.e., 12 hours) or more. In addition, these pressure-sensitive adhesive sheets exhibited excellent properties such that the end peeling height in the repulsion resistance test was 0.5 mm or less and the foam peeling height in the foam repulsion characteristics test was 3 mm or less.

On the other hand, the pressure-sensitive adhesive sheets according to Comparative Examples 1 to 3 lacked a balance in various aspects of their performance. For example, when the target values were set at 12N/20 mm or greater for pressure-sensitive adhesive force, 50 minutes or more for high-temperature holding power, 2 mm or less for repulsion resistance (end peeling height), and 5 mm or less for foam repulsion characteristics (foam peeling height), not all of the target values were not satisfied in any of Comparative Examples.

As described above, aqueous pressure-sensitive adhesive compositions in accordance with the present invention allow formation of pressure-sensitive adhesive layers capable of achieving the plurality of properties (e.g., pressure-sensitive adhesive force and cohesive strength) at a high level and in a well-balanced manner. For example, it is possible to form a pressure-sensitive adhesive sheet including a relatively thick (e.g., a thickness of about 50 μm to 100 μm) pressure-sensitive adhesive layer which exhibits a greater pressure-sensitive adhesive force (adhesive strength) and a sufficient cohesive strength (holding power) for practical use. Compositions in accordance with the present invention are suitable for manufacturing pressure-sensitive adhesive sheets having such pressure-sensitive adhesive layer, e.g., double-faced pressure-sensitive adhesive sheet (including double-faced adhesive tape). In addition, aqueous pressure-sensitive adhesive compositions in accordance with the present invention allow formation of pressure-sensitive adhesive sheets in a good balance of pressure-sensitive adhesive force, cohesive strength under high temperature conditions, surface following ability (curved-surface adhesiveness) on the adherends, and rough surface adhesive property. Taking advantage of these properties, such pressure-sensitive adhesive sheet is preferably used as, for example, a pressure-sensitive adhesive tape for vehicle interior finishing material (double-faced pressure-sensitive adhesive sheet for fixing vehicle interior finishing material, or the like).

What is claimed is:

1. An aqueous pressure-sensitive adhesive composition in which an acrylic polymer serves as a main component and the acrylic polymer is dispersed in water, the aqueous pressure-sensitive adhesive composition containing:
   A) acrylic polymer obtained by polymerizing a monomer raw material including alkyl (meth)acrylate as a main monomer, a first functional monomer having a first functional group to react with a hydrazino group, and a second functional monomer having a second functional group to react with a carbodiimide group;
   B) a hydrazine-based crosslinking agent; and
   C) a carbodiimide-based crosslinking agent;
   wherein the hydrazine-based crosslinking agent and the carbodiimide-based crosslinking agent are contained in a proportion such that the number of moles of the crosslinkable functional group contained in the carbodiimide-based crosslinking agent is 0.2 to 5 times the number of moles of the crosslinkable functional group contained in the hydrazine-based crosslinking agent.

2. The composition of claim 1, wherein 0.001 to 1 part by mass of the hydrazine-based crosslinking agent and 0.01 to 1 part by mass of the carbodiimide-based crosslinking agent, with respect to 100 parts by mass of the acrylic polymer are contained.

3. The composition of claim 1, wherein the number of moles of the first functional group contained in the acrylic polymer is 1.5 times or more the number of moles of hydrazino group contained in the hydrazine-based crosslinking agent.

4. The composition of claim 1, wherein the number of moles of the second functional group contained in the acrylic polymer is 10 times or more the number of moles of carbodiimide group contained in the carbodiimide-based crosslinking agent.

5. The composition of claim 1, wherein the first functional group is a keto group.

6. The composition of claim 5, wherein the first functional monomer is diacetone acrylamide.

7. The composition of claim 1, wherein the second functional group is a carboxyl group.

8. The composition of claim 7, wherein the second functional monomer is (meth)acrylic acid.

9. The composition of claim 1, further containing tackifier having a softening point of 140° C. or higher.

10. The composition of claim 1, wherein the acrylic polymer is an acrylic polymer obtained by applying the monomer raw material to emulsion polymerization.

11. A pressure-sensitive adhesive sheet comprising a pressure-sensitive adhesive layer formed using the aqueous pressure-sensitive adhesive composition of claim 1.

* * * * *